United States Patent [19]

Futaki

[11] Patent Number: 4,629,342
[45] Date of Patent: Dec. 16, 1986

[54] DOT-MATRIX PRINTER WITH PATTERN CHECKING AND PATTERN CORRECTING MEANS

[75] Inventor: Ippei Futaki, Tokyo, Japan

[73] Assignee: Kabushiki Kaisha Toshiba, Kawasaki, Japan

[21] Appl. No.: 672,493

[22] Filed: Nov. 16, 1984

[30] Foreign Application Priority Data

Nov. 30, 1983 [JP] Japan ................................ 58-225739

[51] Int. Cl.$^4$ ............................................. B41J 3/12
[52] U.S. Cl. ................................. 400/121; 101/93.04; 400/74; 400/124
[58] Field of Search .......................... 400/74, 121, 124; 101/93.04, 93.05; 346/76 PH; 340/728, 745

[56] References Cited

U.S. PATENT DOCUMENTS

| 4,162,858 | 7/1979 | Brandenburg | 400/124 |
| 4,291,992 | 9/1981 | Barr | 400/124 |
| 4,339,208 | 7/1982 | Biedermann | 400/74 X |
| 4,347,518 | 8/1982 | Williams | 346/76 PH X |

FOREIGN PATENT DOCUMENTS 145463  8/1983  Japan .................................. 400/121

Primary Examiner—Paul T. Sewell
Attorney, Agent, or Firm—Cushman, Darby & Cushman

[57] ABSTRACT

A dot-matrix printer can register dot character patterns input through an external unit. The present invention has a circuit for checking and correcting a dot character pattern. This circuit checks a dot character pattern stored in a buffer memory to determine whether any two adjacent dots of the pattern, which are arranged in the printing direction, are in contact or not. If the dots contact, one of them is erased, thus correcting the dot character pattern. The corrected dot character pattern is stored in a character generator. The corrected pattern is supplied from the character generator to a drive circuit. The drive circuit drives a print head, etc., whereby the dot character corresponding to the pattern read from the character generator is printed.

4 Claims, 12 Drawing Figures

DOT-MATRIX PRINTER WITH PATTERN CHECKING AND PATTERN CORRECTING MEANS

BACKGROUND OF THE INVENTION

The present invention relates to a dot-matrix printer of a serial type with a character generator for storing dot character patterns input by an external device, and for generating the patterns of dot characters to be printed.

A known dot-matrix printer of a serial type comprises a character generator, a print head-driving circuit and a print head. The printer receives a character code from the external device (usually a host computer). The character generator generates the dot character pattern corresponding to the code. The character patterns are supplied to the print head-driving circuit. This print head driving circuit drives the printing pins of the print head, thereby printing a dot character as shown in FIG. 1.

Recently it has been increasingly demanded that a dot-matrix printer print dot characters of better quality. To meet this demand, a new dot-matrix printer has been invented which can print a character in high density as shown in FIG. 2. The dots forming this character are arranged at half the pitch of those forming the character of FIG. 1, in the direction F in which the print head moves to print dot characters.

The printing speed of the dot-matrix printer is usually determined by the maximum response frequency of the print head, i.e., the frequency at which the head moves in direction F. More specifically, the speed is given as $f/N$ [cps], where f is the maximum response frequency of the head and N is the number of dots of each row of the dot matrix. Since the dots are arranged in direction F at half the pitch of those forming the character shown in FIG. 1, the printing speed of the printer is half that of the ordinary dot-matrix printer.

When a dot-matrix printer prints dots at a far smaller pitch than those forming the character of FIG. 1, as shown in FIG. 3A, its printing speed is given as $f/N$ [cps], where f is the maximum response frequency of the printer. To raise the printing speed, N may be decreased. Hence, when the printer prints dots at half the pitch as shown in FIG. 3B, the speed rises to $2f/N$ [cps]. When it prints dots at one-third the pitch as illustrated in FIG. 3C, it rises to $3f/N$ [cps]. Yet the printed characters have better quality since the dots arranged at the pitches (FIGS. 3B and 3C) are far smaller than the dots forming the character of FIG. 1.

The character generator and provided in a dot-matrix printer is a ROM (read-only memory) in most cases. The ROM stores the dot patterns corresponding to character codes. To print a special character whose dot pattern is not stored in the ROM, the ROM must be replaced by a ROM which stores the pattern of the special character. It is troublesome to replace one ROM with another, however. To avoid his trouble, a dot-matrix printer has been invented which can register the dot patterns of special characters through an external device. This printer is equipped with a character register/generator comprising a RAM (random-access memory) which can store the dot pattern of any character other than those stored in the ROM, which has been input through the external device. The printer can thus print the dot character of any pattern input through the external device.

The dot-matrix printer described in the preceding paragraph operates in the following manner. First, the external device supplies the printer with a pattern registration command. The printer therefore becomes ready to register any dot character pattern. Then, a character code, and data showing character pitch L1 (FIG. 4) and character width L2, both shown in FIG. 4, are supplied from the external device to the printer. The character width L2 determines the number of bytes representing the dot character pattern to be registered, and the character code determines the address of the RAM in which this pattern is to be registered. The dot character pattern is supplied to the RAM and is thus registered therein.

To print a dot character whose pattern has been input through the external device at a high speed the pattern must be registered in the form shown in FIG. 3B. However, the more complex the dot pattern is, the more often it is registered in an erroneous form. When the pattern is erroneously registered such that some of its dots are arranged as densely as shown in FIG. 3A, the pins of the print head may be broken during high-speed printing.

SUMMARY OF THE INVENTION

Accordingly, one object of the present invention is to provide a dot-matrix printer whose print head is not damaged even if a dot character is printed at a high speed, where the character pattern has been registered through an external device and which is improper for high-speed printing.

The dot-matrix printer of this invention comprises: buffer memory means for storing printing data containing a dot character pattern input through an external unit and a character code corresponding to the dot character pattern; pattern-checking means for determining whether any two adjacent dots of the pattern which are arranged in the printing direction are in contact; pattern-correcting means for erasing any adjacent dots if they are found to contact, thereby correcting the dot character pattern; memory means for registering the dot character pattern corrected by the pattern-connecting means or input through the external device at the address corresponding to the character code; and printing means for printing a dot character of the pattern read from the memory means in accordance with the printing data input through the external device.

In the dot-matrix printer of the invention, the dot character pattern registered in the memory means is checked to see if it is a correct one that can be printed at a high speed without damaging the printing means. When the pattern is found to be incorrect, it is corrected by the pattern-correcting means. Hence, even if an erroneous dot character pattern is supplied from the external device, the printer can reliably print the character.

DETAILED DESCRIPTION OF THE PREFERRED EMBODIMENTS

Figure 5:
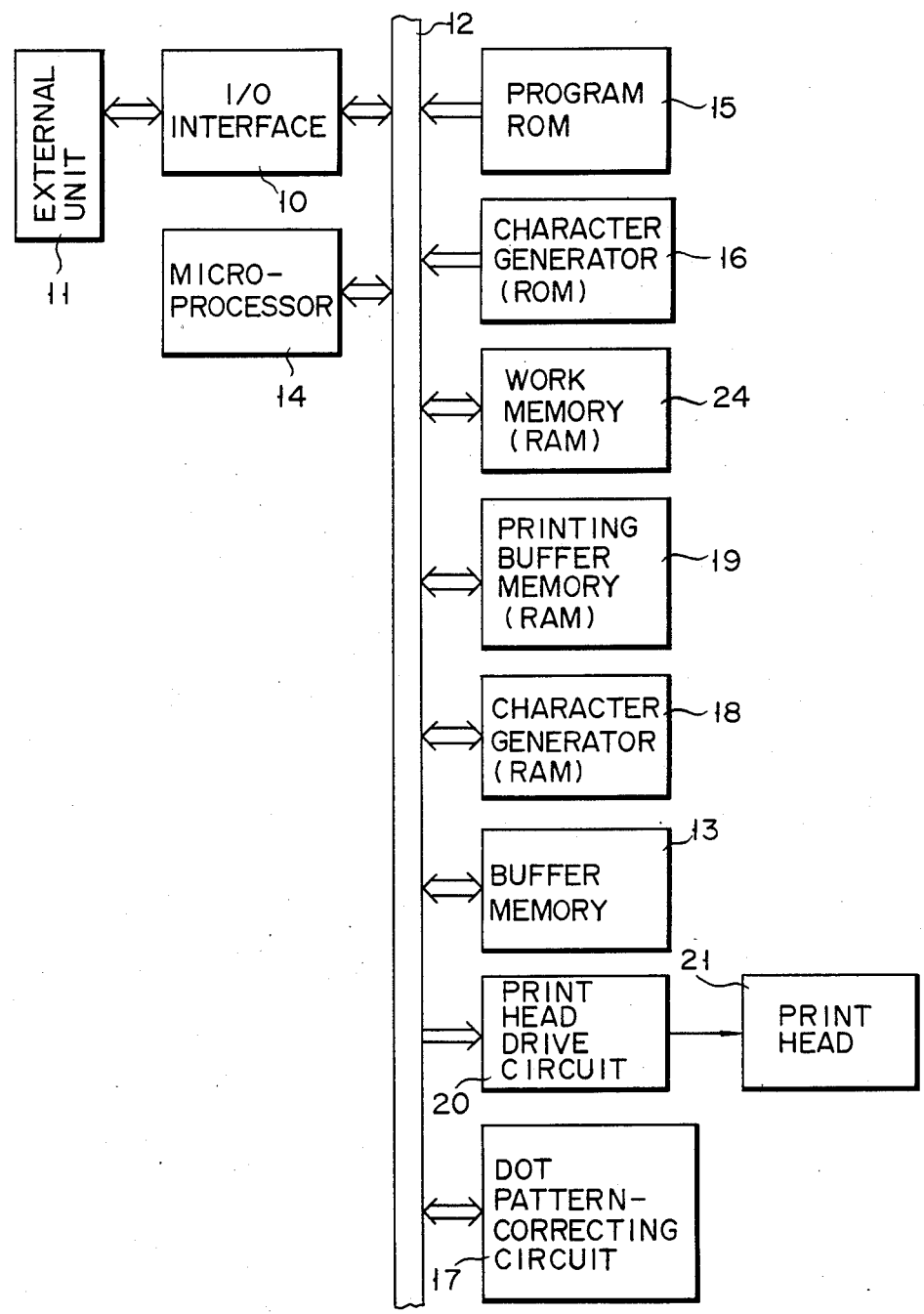
FIG. 5 is a block diagram of a dot-matrix printer according to the present invention.

One embodiment of the invention will be described with reference to FIGS. 5 through FIG. 8. FIG. 5 is a block diagram of this embodiment, i.e., a dot-matrix printer. As shown in this figure, an I/O interface circuit 10 receives printing data, i.e., a character code, and a dot character pattern to be registered, both supplied from an external unit 11, for example, a host computer. The printing data and the code are supplied to a bus 12 from the circuit 10. A buffer memory 13 temporarily stores the printing data and the code. A CPU 14, i.e., a microprocessor, controls the other elements of the printer in accordance with the program stored in a program ROM 15. When the printer is set to the ordinary printing mode, the CPU 14 reads the character code from the buffer memory 13 and causes a ROM 16, i.e., a character generator, to output the dot character pattern corresponding to the character code. The ROM 16 stores the dot patterns of ordinary characters.

Under the control of the CPU 14, a pattern-correcting circuit 17 checks the dot character pattern stored in the buffer memory 13 to determine whether or not the pattern is appropriate for high-speed printing. If the circuit 17 finds this pattern improper for high-speed printing, it corrects the pattern. More specifically, the circuit 17 determines whether or not any two adjacent dots arranged in the printing direction contact, and erases one of these dots if they are in contact, thereby correcting the dot character pattern. The pattern is supplied from the circuit 17 to the buffer memory 13. The dot pattern corrected by the circuit 17 is stored in a RAM 18, i.e., a character register/generator, and is stored at the address corresponding to the character code.

The dot character pattern read from the ROM 16 or the RAM 18 is stored in a print buffer 19 (RAM). After storing one line of dot character patterns, the print buffer 19 outputs these patterns, one by one, to a print drive circuit 20. Under the control of the CPU 14, the circuit 20 drives a print head 21 in accordance with the dot character pattern supplied from the print buffer 19. A work memory 24 (RAM) is provided to temporarily store the data processed by the CPU 14.

Figure 6:
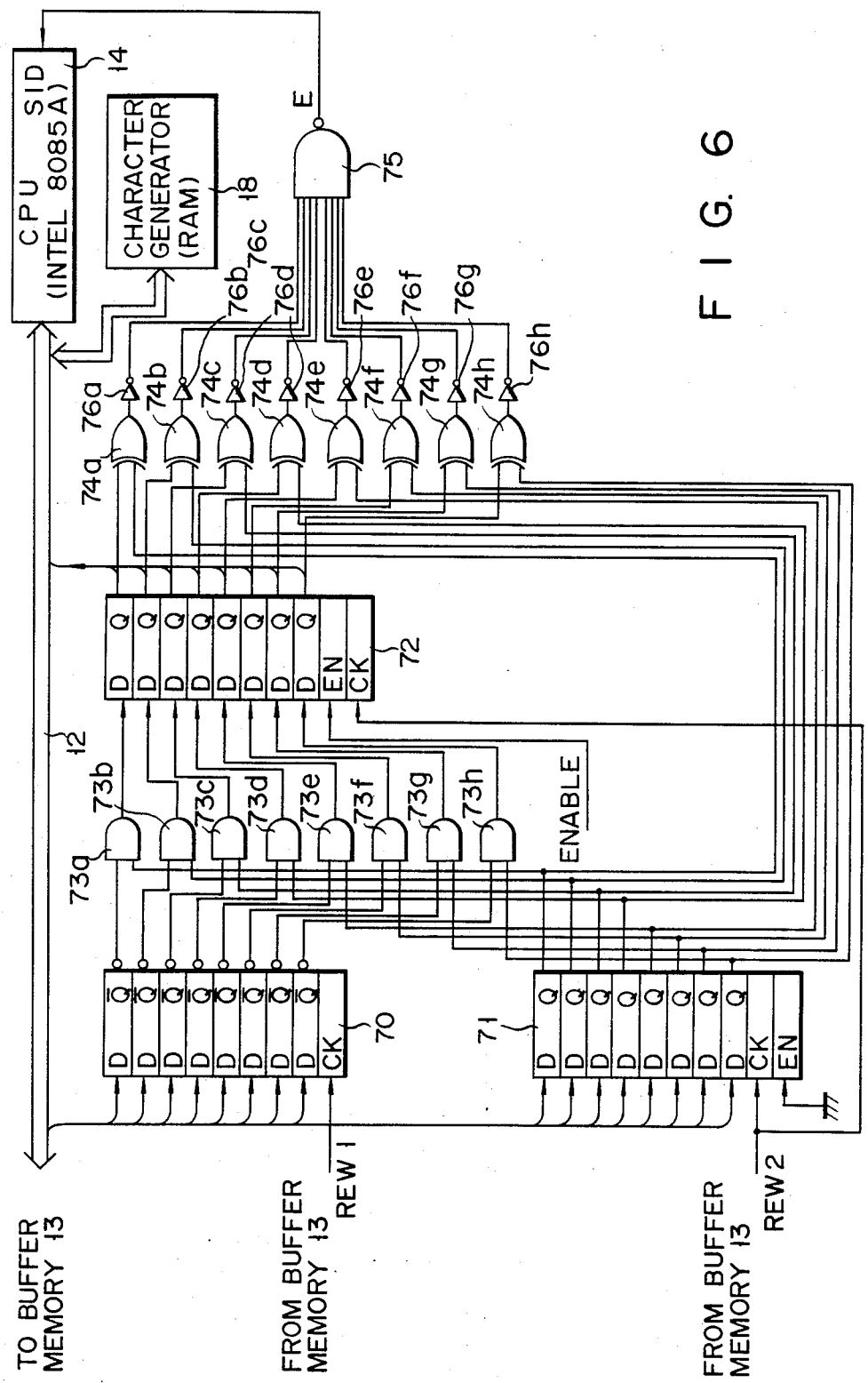
FIG. 6 is a block diagram showing the pattern-correcting circuit of the printer shown in FIG. 5 and the circuits provided near the pattern-correcting circuit.
Figure 7:
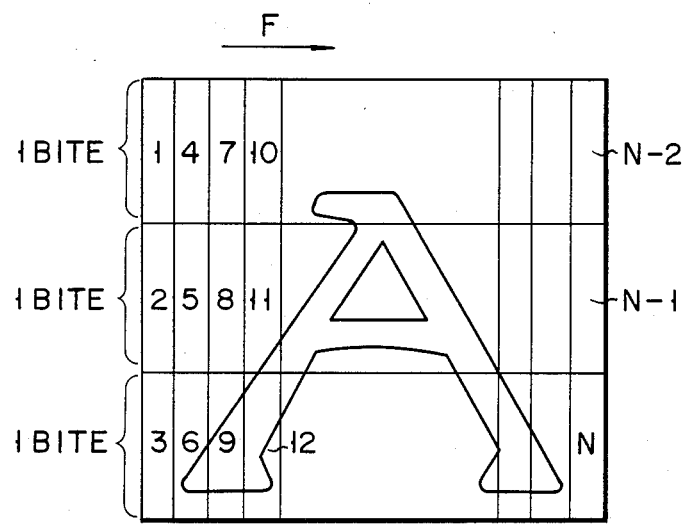
FIG. 7 schematically shows the data stored in the print buffer memory of the printer shown in FIG. 5.
Figure 8:
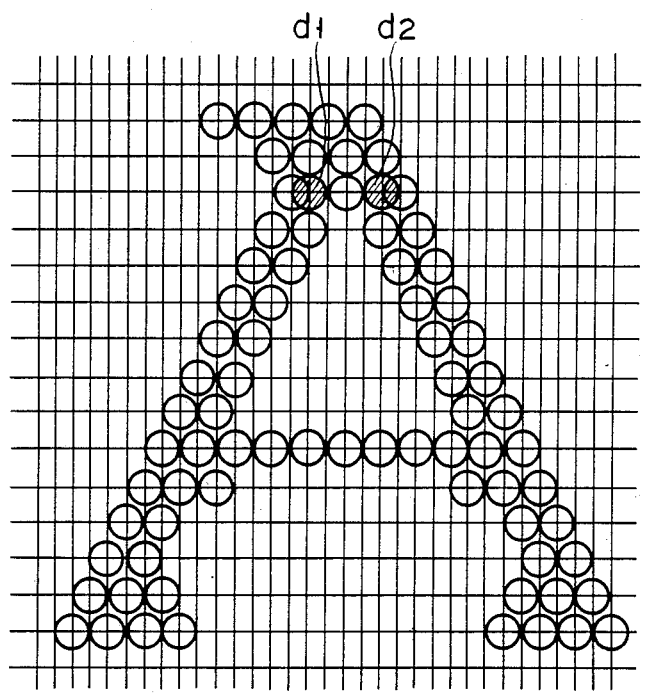
FIG. 8 shows a dot character pattern registered in the print buffer memory.

The pattern-correcting circuit 17 and the elements connected to it will now be explained with reference to FIG. 6. As shown in this figure, the circuit 17 has registers 70, 71 and 72 each for storing an 8-bit dot pattern data. The register 70, which is made of two chips 74LS174 of Texas Instruments Inc., is used to store nth dot pattern (1 byte) of the character pattern stored in the buffer memory 13. As shown in FIG. 7, the character pattern stored in the buffer memory 13 consists of N 1-byte dot patterns. Dot patterns 1, 4, 7 . . . N-2 are arranged in the horizontal direction corresponding to the printing direction F, forming the upper row. Dot patterns 2, 5, 8 . . . N-1 are arranged in the same manner, thus forming the middle row. Dot patterns 3, 6, 9 . . . N are also arranged horizontally, thus forming the lower row.

The bits of any dot pattern data (1 byte) stored in the register 70 are inverted and supplied to the first input terminals of AND circuits 73a–73h. The register 71, which is made of one chip 74LS373 of Texas Instruments Inc., is used to store the (n+3)th dot pattern read from the buffer memory 13. The bits of any dot pattern data stored in the register 71 are supplied to the second input terminals of the AND circuit 73a–73h. The 1-byte data formed of the output signals of these AND circuits is input to the register 72 made of chip 74LS374 of Texas Instruments Inc.

The eight output bits of the register 72 are supplied to the first input terminals of exclusive-OR circuits 74a–74h (hereinafter called EX-OR circuits). The bits of the (n+3)th dot pattern stored in the register 71 are supplied to the second input terminals of these EX-OR circuits. The output bits of the EX-OR circuits 74a–74h are supplied through inverters 76a–76b to the input terminals of a NAND circuit 75. The NAND circuit 75 outputs an error signal E, which is supplied to the CPU 14. The CPU 14 is model 8085A of Intel Corp. The signal E is supplied to the SID (serial input data) terminal of the CPU 14. The data stored in the register 72 represents the pattern having its dot arrangement corrected. This data is thus stored in the (n+3)th address of the buffer memory 13.

Figure 1:
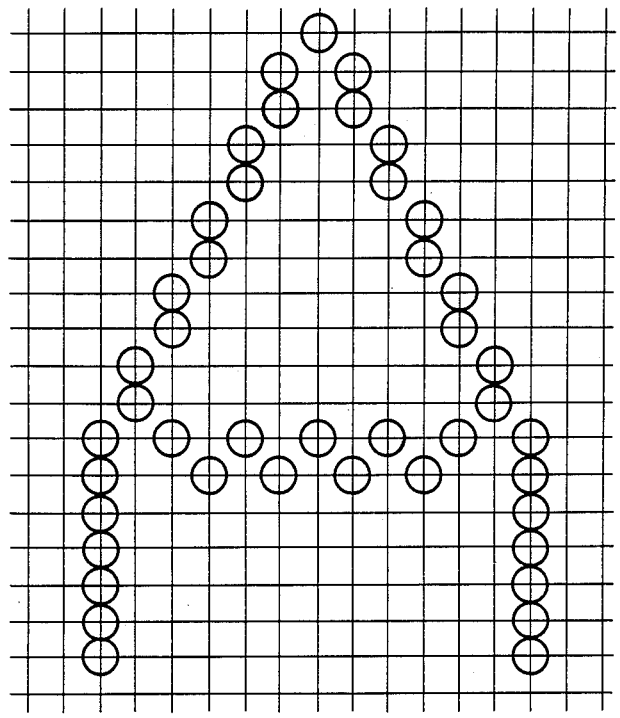
FIGS. 1 and 2 show the patterns of the dot characters printed by the conventional dot-matrix printers.
Figure 2:
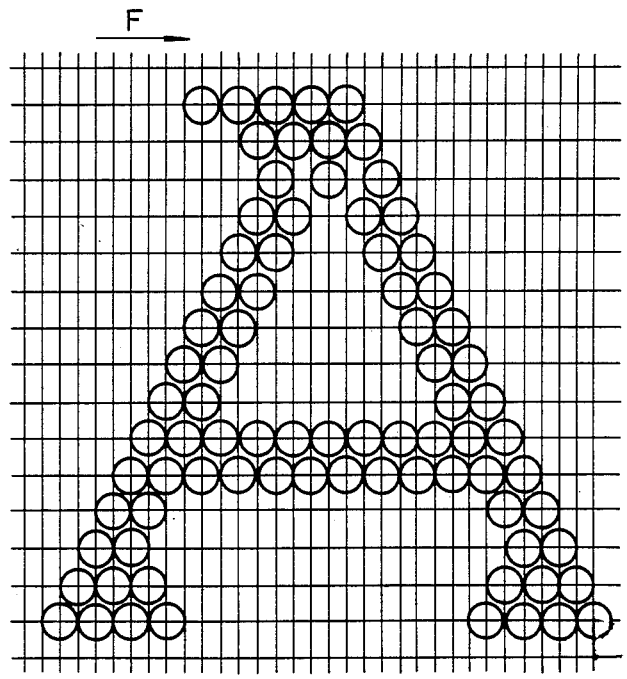
Figure 3A:
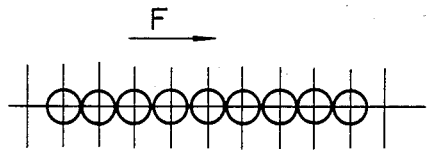
FIGS. 3A, 3B and 3C show dot character patterns, illustrating the operation of a conventional dot-matrix printer.
Figure 3B:
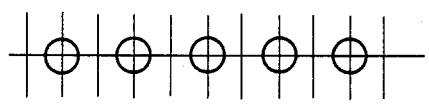
Figure 3C:
Figure 4:
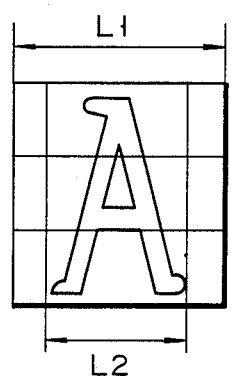
FIG. 4 shows the items of printing data which are used in registering the dot pattern of a special character in the character generator of the known dot-matrix printer.

The operation of the dot-matrix printer will now be explained. First, the external unit 11 supplies the printer with a pattern registration command. The printer therefore becomes ready to register any dot character pattern. Then, a dot character pattern to be registerd and printing data containing a character code and data showing the character pitch L1 (FIG. 4) and the character width L2 (FIG. 4) are supplied from the unit 11 to the I/O interface circuit 10. Upon receipt of said command, the CPU 14 sets the printer to a pattern registration mode so that the dot character pattern defined by the pitches L1 and L2 may be stored in the register RAM 18. The dot character pattern and the printing data are temporarily stored in the buffer memory 13. The CPU 14 determines the number of bytes representing the dot character pattern, i.e., the size of data to be stored in the RAM 18, in accordance with the character pitch L1 and character width L2, thereby forming a bit pattern (FIG. 7).

The CPU 14 instructs the pattern-correcting circuit 17 to check whether or not the dots of the input character pattern are arranged in direction F at a pitch appropriate for high-speed printing. That is, the circuit 17 determines whether any two adjacent dots arranged in the printing direction F contact or not. More precisely, the dot pattern 1 stored in the buffer memory 13 is written in the register 70 when a write pulse RW1 is supplied from the CPU 14 to the clock terminal CK of the register 70. The dot pattern 4 in the buffer memory 13 is input to the register 71 when a write pulse RW2 is supplied from the CPU 14 to the clock terminal CK of the register 71. The dot pattern data 4 represents eight dots to the right of those represented by the dot pattern data 1.

The bits of the dot pattern data 1 are inverted and supplied from the register 70 to the first terminals of the AND circuits 73a–73h. The bits of the dot pattern data 4 are supplied to the second input terminals of the AND circuits 73a–73h. As a result, each of these AND circuit outputs "0" when the bit of the data 1 and the bit of the data 4 at the horizontally aligned position (FIG. 7) are "1"; it outputs the bits of the data 4 when these two bits have different logical levels. Hence, in the dot pattern data formed of the outputs of the AND circuits 73a–73h, any "0" bit shows the absence of a dot and any "1" bit shows the presence of a dot. This dot pattern data is stored in the register 72. The bits of this data are supplied to the first input terminals of the EX-OR circuits 74a–74h. The bits of the dot pattern data 4 stored in the register 71 are supplied to the second input terminals of these EX-OR circuits. Therefore, the NAND circuit 75 outputs an error flag signal E which is at logical "0" level when the dot pattern data in the register 71 is identical with that stored in the register 72 and at logical "1" level when the dot pattern in the register 71 is different from that stored in the register 72. This signal E is supplied to the CPU 14. When the signal E is at logical "1," the CPU 14 writes the dot pattern data in the register 72 in the buffer memory 13 in place of the data 4.

Thereafter, the dot patterns 2 and 5 in the buffer memory 13 are written in the registers 70 and 71 in the same manner as the patterns 1 and 4. The dot pattern data 2 represents eight dots to the right of those represented by the dot pattern data 5. The bits of the data 2 and those of the data 5 are processed in the same way as those representing the dot patterns 1 and 4, so that the dot pattern 5 is corrected or not corrected as the case may be. Then, the dot pattern data 3 and the dot pattern data 6 are processed in the same manner. Any other two dot patterns, i.e., the nth and (n+3)th, are processed likewise.

When the last pair of dot patterns (N-3) and N is processed, the dot character pattern stored in the buffer memory 13 is corrected, and no adjacent two dots arranged in direction F contact. In other words, the dots of the character represented by the data stored in the memory 13 are arranged in the printing direction at the pitch appropriate for high-speed printing. The corrected dot character pattern is stored in the register RAM 18. Accordingly, the dot character pattern shown in FIG. 8 in which two dots d1 and d2 overlap, the adjacent one is corrected by deleting these dots d1 and d2, and the corrected dot character pattern is stored in the register RAM 18.

When the dot-matrix printer is set to the high-speeding printing mode, the dot character pattern data is supplied from the RAM 18 to the drive circuit 20, whereby the dot character of this pattern is printed at a high speed.

Figure 9:
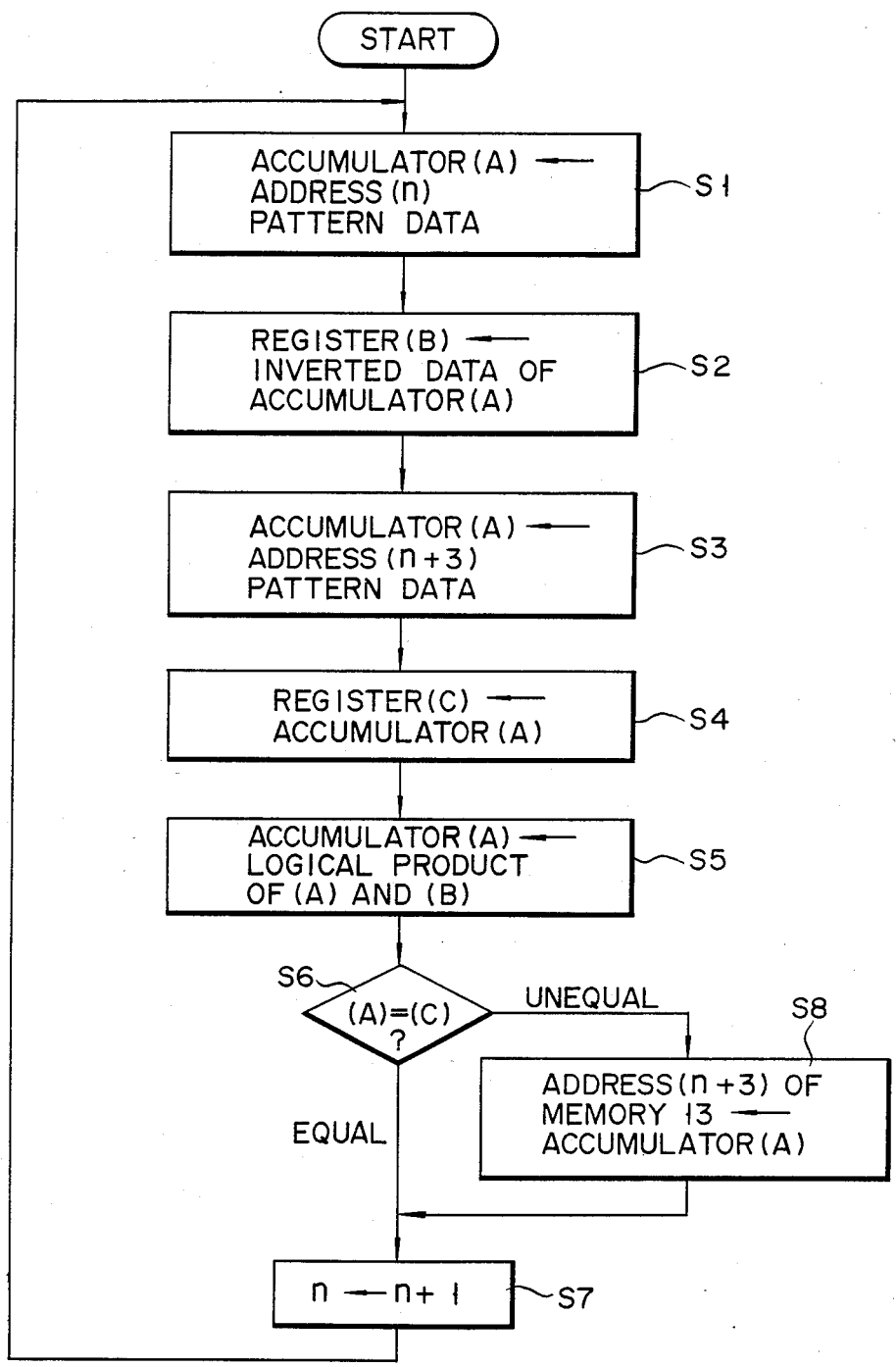
FIGS. 9 and 10 are flow charts explaining the operation of the printer shown in FIG. 5.

The operation of the pattern-correcting circuit 17, i.e., the checking and correcting of the character pattern to be registered in the RAM 18, may be performed by the CPU 14 as will be explained with reference to the flow chart of FIG. 9.

In step S1, the CPU 14 loads dot pattern data n from the buffer memory 13 to an accumulator (A). Then, in step S2, the dot pattern data n is inverted and stored in a register (B). The dot pattern data (n+3) is loaded from the memory 13 to the accumulator (A) in step S3. The data (n+3) in the accumulator (A) is stored in a register (C) in step S4. Thereafter, the CPU 14 generates the logical product of the data n stored in the accumulator (A) and the data stored in the register (B) in step S5. That is, the logical product of the data n and the data (n+3) is provided. More precisely, any dot represented by the data (n+3) is deleted if it is at the right of the corresponding dot represented by the data n, whereby the dot pattern data (n+3) is corrected, and the corrected dot pattern data (n+3) is stored in the accumulator (A). In step 6, the CPU 14 compares the corrected data stored in accumulator (A) with the data in the register (C).

If the data in the accumlator (A) is identical with the data (n+3) stored in the register (C), the next dot pattern data is read from the buffer memory 13 in step S7. In this case, it is determined that the dot pattern (n+3) has not dot to the right of the corresponding dot of the pattern n.

If the corrected data is different from the data (n+3) stored in the register (C), the data in the accumulator (A) is stored in the buffer memory 13, replacing the dot pattern data (n+3), in step S8. In this case, it is determined that the dot pattern (n+3) has at least one dot which is to the right of the corresponding dot of the pattern n.

Figure 10:
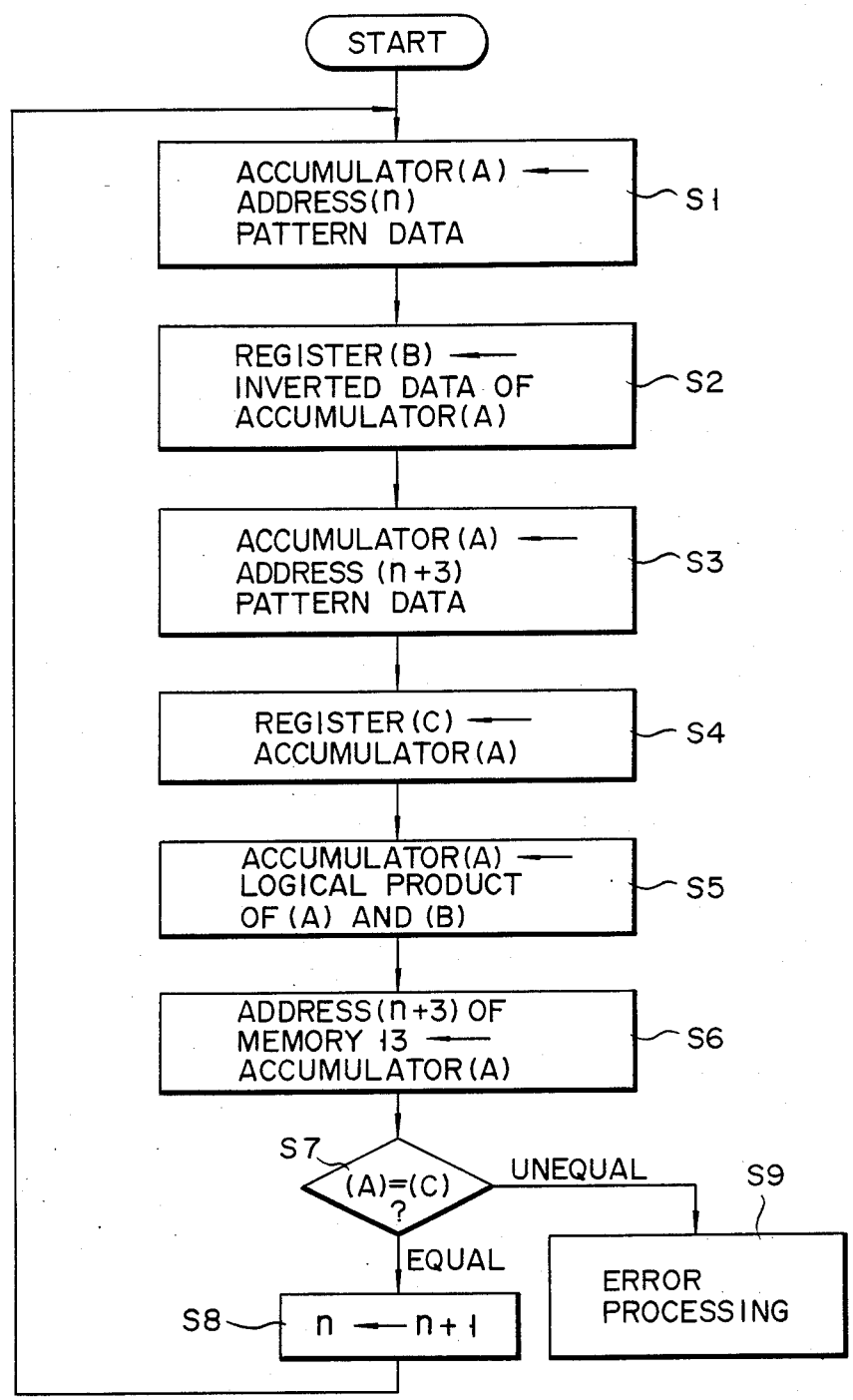

The checking and correcting of the character pattern to be registered in the RAM 18 may be performed also by the CPU 14 in a different manner, as shown in the flow chart of FIG. 10. That is, before determining in step S7 whether or not at least one dot of the dot pattern (n+3) is positioned to this right of the corresponding dot of the dot pattern n, the corrected dot pattern (n+3) is stored in the buffer memory 13 in step S6. When the corrected data is different from the data (n+3) stored in the register (C), the CPU 14 performs error processing in step S9; it shows the user of the printer that the dot character pattern he or she has input cannot be registered, by flickering a display made of light-emitting diodes. The step S6 (FIG. 10) may be omitted. If this is the case, the user corrects the dot character pattern when he is informed of an error in the pattern, and the corrected pattern is registered in the RAM 18. Also in this case, a dot character pattern which can be printed at a high speed can be registered in the RAM 18.

What is claimed is:

1. A dot-matrix printer comprising:
   buffer memory means adapted for storing a dot character pattern including a plurality of dot pattern data which has been input through an external unit, and a character code corresponding to the dot character pattern;
   pattern-correcting means for receiving from said buffer memory means first and second adjacent dot pattern data from the same line of said dot character pattern in a printing direction, and for selectively erasing a dot from one of said first and second dot pattern data when said data from said one of said first and second dot pattern data is adjacent a dot from the other of said first and second dot pattern data;
   register means for storing the corrected data produced by said pattern-correcting means;
   pattern-checking means for comparing the data stored in said register with data representing said first dot pattern data, and for generating, when the data stored in said register is different from said first dot pattern data, a check signal indicating contact between any two adjacent dots of said first dot pattern data which are arranged in said printing direction;

control means for detecting, upon receipt of said check signal from said pattern-checking means, when any two adjacent dots of said first dot pattern data which are arranged in said printing direction are in contact, and then causing said pattern-correcting means to transfer the data from said register means to said buffer memory means; and printing means for printing a dot character pattern read from said character memory means is accordance with printing data input through said external device.

2. A dot-matrix printer according to claim 1, wherein said control means is included in a microprocessor.

3. A dot-matrix printer according to claim 1, wherein said pattern-correcting means includes AND gate circuit means for receiving from said buffer memory means said first dot pattern data and data obtained by inverting said second dot pattern data, and for producing corrected pattern data, the corrected data produced by said AND gate circuit means being stored in said buffer memory means.

4. A dot-matrix printer according to claim 1, wherein said pattern-checking means and pattern-correcting means are included in a microprocessor.

* * * * *